United States Patent [19]

Ahn

[11] Patent Number: 5,500,778
[45] Date of Patent: Mar. 19, 1996

[54] CASSETTE LID PRE-OPENING DEVICE

[75] Inventor: Seong-Ick Ahn, Seoul, Rep. of Korea

[73] Assignee: Daewoo Electronics Co., Ltd., Seoul, Rep. of Korea

[21] Appl. No.: 306,905

[22] Filed: Sep. 15, 1994

[30] Foreign Application Priority Data

Sep. 15, 1993 [KR] Rep. of Korea ............. 93-18536

[51] Int. Cl.⁶ ............................................. G11R 15/675
[52] U.S. Cl. .................... 360/96.5; 242/338; 242/338.4
[58] Field of Search ...................... 360/96.5, 96.6, 360/93; 242/338, 338.4

[56] References Cited

U.S. PATENT DOCUMENTS 4,794,477 12/1988 Hashiguchi et al. ............... 360/96.5

FOREIGN PATENT DOCUMENTS

| 61-020254 | 1/1986 | Japan | 360/96.5 |
| 63-050968 | 3/1988 | Japan | 360/96.6 |
| 04-038652 | 2/1992 | Japan | 360/96.5 |
| 4-149849 | 5/1992 | Japan | 360/96.6 |

*Primary Examiner*—Stuart S. Levy
*Assistant Examiner*—Craig A. Renner
*Attorney, Agent, or Firm*—Anderson Kill Olick & Oshinsky

[57] ABSTRACT

A cassette lid pre-opening device for use in a VCR employs an actuating lever having a folded-in end for biasing the locking lug of a cassette inserted in the VCR to a release position, and a fan-shaped end having a protrusion for pre-opening the cassette lid. The protrusion has a slope for slightly opening the cassette lid to a given angular extent as a preparatory operation for the opening of the access lid.

1 Claim, 2 Drawing Sheets

5,500,778

1

CASSETTE LID PRE-OPENING DEVICE

FIELD OF THE INVENTION

The present invention relates to a cassette lid pre-opening device for use in a video cassette recorder("VCR"); and, more particularly, a cassette lid pre-opening device capable of opening a cassette lid of a tape cassette to a given angular extent as a preparatory operation for the opening of the cassette lid.

DESCRIPTION OF THE PRIOR ART

Typically, a cassette loading device for use in a VCR includes means for keeping a cassette holder immovable with respect to a top plate which fixedly mounts on a pair of side walls of a deck chassis while a tape cassette is inserted into the cassette holder. Further, it has means for tentatively opening the cassette lid before a vertical descent of the cassette holder together with the cassette into the VCR so as to facilitate the complete opening of the lid.

In FIGS. 1A and 1B, there are shown a holder locking lever 6 and a pre-opening lever 7 utilized in a prior art loading device, each corresponding to the cassette holder locking means and the cassette lid pre-opening means described above.

Referring to FIG. 1A, the holder locking lever 6 having a locking finger 6b and a contacting portion 6a is pivotably mounted on a cassette holder 5a which receives a manually inserted tape cassette 4 until the tape cassette 4 arrives at a given position on the cassette holder 5a to thereby load the tape cassette 4 into an operative position thereof. The locking finger 6b which is arranged on the holder locking lever 6, for being retained through a hole 3a of a fixed top plate 3 to thereby restrain a movement of the cassette holder 5a until the holder locking lever 6 is pivoted in response to an engagement of a contact portion 6a thereof by an advancement of the tape cassette 4 inserted toward the direction indicated with an arrow.

In FIG. 1B, a pre-opening lever 7 is generally installed on the cassette holder 5b, in an opposite relationship to said holder locking lever 6, to slightly open the cassette lid 4a for a main opening operation to follow. The pre-opening lever 7 comprises an opening finger 7b protruding from the lever 7 perpendicularly to a principal plane of the lever 7 and a projection arm 7a having a bearing surface 7c. After the position lock of the cassette holder 5b by the locking lever 6, as described above, is released, the cassette holder 5b begins to move in the direction indicated with an arrow so as to load the tape cassette 4 into its operative position. During the loading movement of the cassette holder 5b, said pre-opening lever 7 is pivoted by a depression of a camming surface 2a of the top plate 2 against the bearing surface 7c, as the opening finger 7b operates to swing a cassette lid 4a at a given angular extent.

On the other hand, as the cassette 4 is being inserted into the cassette holder 5b, a release gadget 8 carried by the cassette holder 5b begins to push a locking lug(not shown) of the cassette 4 into a released position, thereby causing the cassette lid 4a to be in a swingable condition with respect to a cassette frame.

In the prior art cassette loading device described above, however, since the release gadget 8 and the cassette lid pre-opening means 7 exist as separate members from each other, the cassette loading device has the disadvantages of a larger number of components and a higher degree of difficulties of designing and manufacturing thereof.

SUMMARY OF THE INVENTION

It is, therefore, an object of the present invention to provide a cassette loading device for use in a VCR comprising a bifunctional actuating lever which releases a locking lug of the cassette and at the same time carries out the pre-opening operation of the cassette lid.

These and other objects of the present invention are accomplished by means of a cassette lid pre-opening device incorporated in a VCR for releasing a locking lug of a cassette inserted into the VCR and pre-opening a cassette lid of the cassette, said device comprising:

an actuating lever having a folded-in end for biasing the locking lug of the cassette to a release position, and a fan-shaped end having a protrusion for pre-opening the cassette lid;

a cassette holder, on which the actuating lever is pivotably mounted, having a pair of rectangular apertures through which the folded-in end and the protrusion are inserted; and a coil spring connected to a portion of the actuating lever at its one end and connected to a portion of the cassette holder at its other end.

BRIEF DESCRIPTION OF THE DRAWINGS

The above and other objects, advantages and features of the present invention will be apparent from the following description of preferred embodiments taken in conjunction with the accompanying drawings, wherein.

DETAILED DESCRIPTION OF THE PREFERRED EMBODIMENTS

Figure 1A:
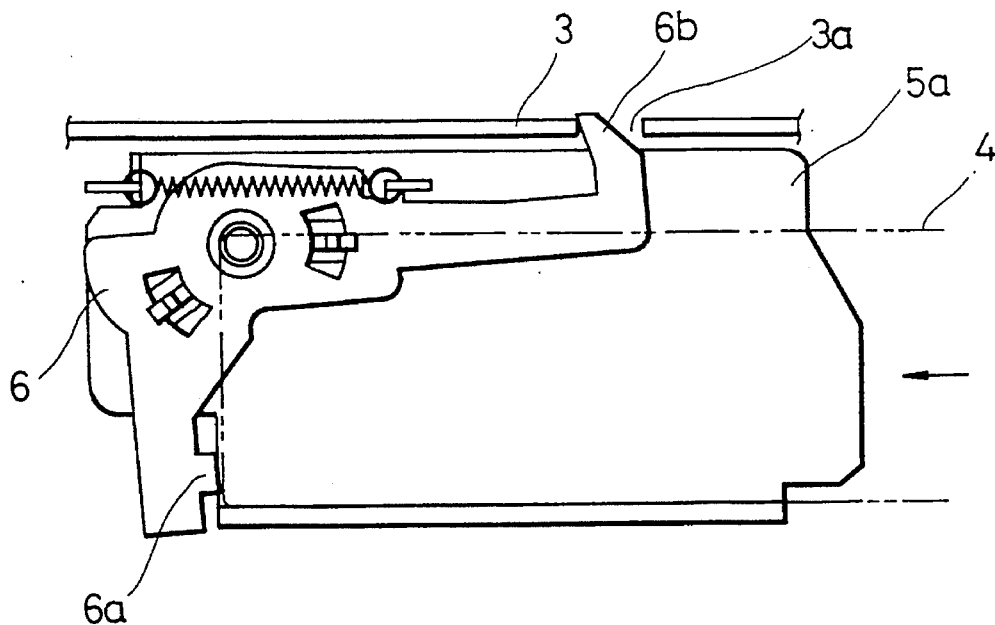
FIGS. 1A and 1B show schematic views of a holder locking lever and a pre-opening lever utilized in a prior art cassette loading device.
Figure 1B:
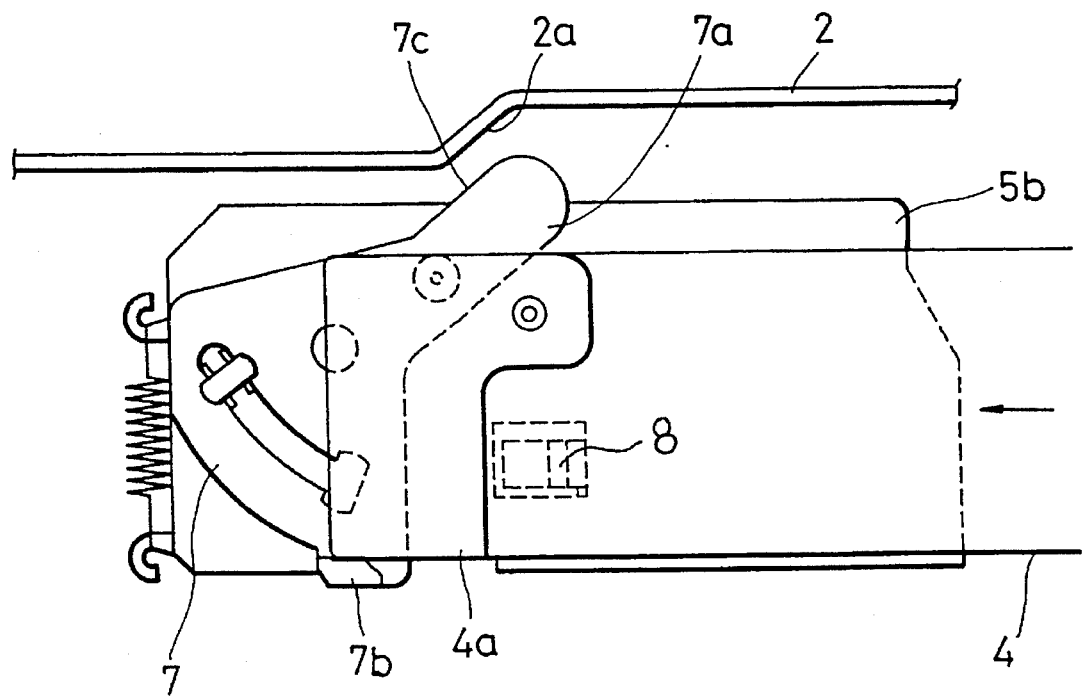
Figure 2:
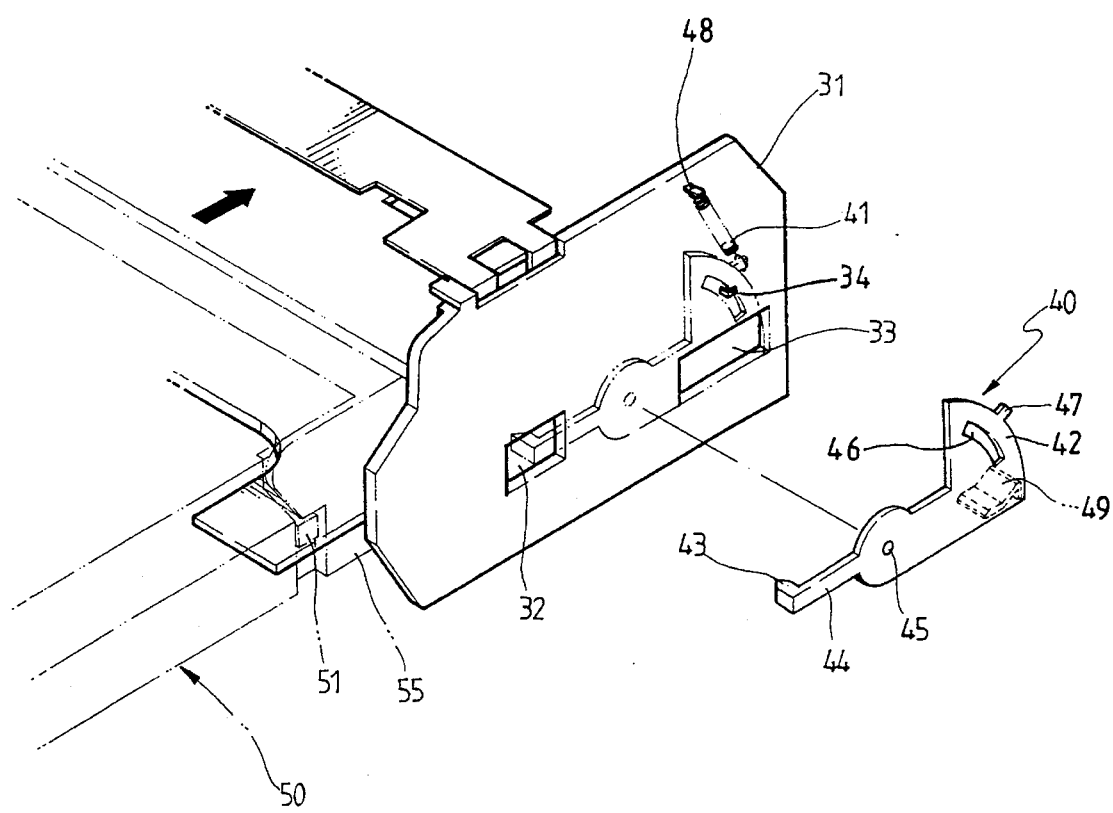
FIG. 2 illustrates a perspective view of a cassette lid pre-opening device in accordance with the present invention.

Referring to FIG. 2, there is shown a cassette lid pre-opening device in accordance with the present invention. As shown, the cassette lid pre-opening device includes an actuating lever 40, generally thin plate-like, having a folded-in end 43 for biasing a locking lug 51 of a cassette 50 to a release position, and a fan-shaped end 42 having a protrusion 49 for pre-opening the cassette lid 55, an arcuate slot 46 through which a guide lug 34 of the cassette holder 31 is inserted and a first hook 47 to which one end of a coil spring 41 is connected. The actuating lever 40 is pivotably mounted on the cassette holder 31 about a hinge 45. The cassette holder 31 has a pair of rectangular apertures 32 and 33 through which the folded-in end 43 and the protrusion 49 are inserted, and a second hook 48 to which the other end of the coil spring 41 is connected. The folded-in end is integrated with a flexible portion 44 and protruded therefrom perpendicularly to the principal plane of the actuating lever 40, thereby biasing the locking lug in the direction of release upon contact therewith.

When the cassette 50 is inserted into the cassette holder 31 in the direction indicated with an arrow, the folded-in end 43 urges the locking lug 51 to ensure that the cassette lid 55 is freely swingable with respect to the cassette 50. At the same time, the cassette lid 55 rides on the protrusion 49 and advances along a slope of the protrusion 49 to be pre-opened at a predetermined angular extent. Further, having the actuating lever 40 biased upwardly by the coil spring 41 helps to ensure that the cassette lid 55 remains pre-opened. Subsequently, a vertical descent of the cassette 50 causes the cassette lid 55 to be fully opened in a known manner.

Although the invention has been shown and described with respect to the exemplary embodiments, it should be understood by those skilled in the art that various changes, modifications and additions may be made without departing from the spirit and scope of the invention.

What is claimed is:

1. A cassette lid pre-opening device for use in a video cassette recorder to release a locking lug of a cassette inserted into the video cassette recorder and pre-open a cassette lid of the cassette, said device comprising:

an actuating lever having a folded-in end for biasing the locking lug of the cassette to a release position and a fan-shaped end having a protrusion for pre-opening the cassette lid, the protrusion being provided with a slope to allow the cassette lid to ride on and to advance along the slope;

a cassette holder, with the actuating lever pivotally mounted on a side thereof, having a pair of rectangular apertures through which the folded-in end and the protrusion are inserted; and a coil spring, one end thereof being connected to a portion of the actuating lever and the other end thereof being connected to a portion of the cassette holder.

\* \* \* \* \*